(12) United States Patent
Boyarshinov et al.

(10) Patent No.: US 11,049,137 B2
(45) Date of Patent: Jun. 29, 2021

(54) SYSTEM AND METHOD FOR HUMAN PERSONALITY DIAGNOSTICS BASED ON COMPUTER PERCEPTION OF OBSERVABLE BEHAVIORAL MANIFESTATIONS OF AN INDIVIDUAL

(71) Applicants: Andrey Y. Boyarshinov, Moscow (RU); Aleksel E. Novokshonov, Ascot (GB); Alexander Kachur, Moscow (RU)

(72) Inventors: Andrey Y. Boyarshinov, Moscow (RU); Aleksel E. Novokshonov, Ascot (GB); Alexander Kachur, Moscow (RU)

(73) Assignee: Andrey Yurevich Boyarshinov, Perm (RU)

( * ) Notice: Subject to any disclaimer, the term of this patent is extended or adjusted under 35 U.S.C. 154(b) by 661 days.

(21) Appl. No.: 15/267,018

(22) Filed: Sep. 15, 2016

(65) Prior Publication Data

US 2018/0075483 A1 Mar. 15, 2018

(51) Int. Cl.
*G06Q 30/02* (2012.01)
*G06N 5/02* (2006.01)
*G06Q 30/06* (2012.01)

(52) U.S. Cl.
CPC ......... *G06Q 30/0255* (2013.01); *G06N 5/022* (2013.01); *G06Q 30/0631* (2013.01)

(58) Field of Classification Search
None
See application file for complete search history.

(56) References Cited

U.S. PATENT DOCUMENTS

| 2010/0049802 | A1* | 2/2010 | Raman | G06Q 30/02 709/204 |
|---|---|---|---|---|
| 2013/0138503 | A1* | 5/2013 | Brown | G06Q 30/0246 705/14.45 |
| 2015/0006286 | A1* | 1/2015 | Liu | G06Q 50/01 705/14.53 |
| 2015/0227843 | A1 | 8/2015 | Angell et al. | |
| 2015/0278590 | A1 | 10/2015 | Gunjan | |

(Continued)

OTHER PUBLICATIONS

Liu et al., "Analyzing Personality through Social Media Profile Picture Choice", Proceedings of the International AAAI Conference on Web and Social Media (ICWSM), vol. 10, No. 1, Mar. 2016. (Year: 2016).*

(Continued)

*Primary Examiner* — Christopher B Tokarczyk
(74) *Attorney, Agent, or Firm* — Dergosits & Noah LLP (57) ABSTRACT

The invention relates to a method of predicting personality based on data generated from multiple data sources and determining a recommended item based on the predicted personality. A platform server receives, from a plurality of source devices, personality data associated with a user. Using the received personality data, the platform server generates a set of diagnostic features. At least one model is applied to the set of generated diagnostic features to generate at least one personality measurement. The personality measurements are used to generate a personal profile. The personal profile is matched to at least one recommended item, and the recommended item is transmitted to the user.

25 Claims, 7 Drawing Sheets

(56) References Cited

U.S. PATENT DOCUMENTS

| | | | |
|---|---|---|---|
| 2015/0286627 A1* | 10/2015 | Chang ................... | G06F 40/205 |
| | | | 704/9 |
| 2015/0310344 A1 | 10/2015 | Gunjan | |
| 2016/0019411 A1 | 1/2016 | Bart et al. | |
| 2016/0335404 A1* | 11/2016 | Srinivas ................. | G16H 40/20 |
| 2017/0061448 A1* | 3/2017 | Akkiraju ................ | G06Q 30/02 |

OTHER PUBLICATIONS

International Preliminary Report on Patentabiity and Written Opinion of International Searching Authority dated Mar. 28, 2019 related to International Appl No. PCT/IB2016/001527, 9 pages.
International Search Report and Written Opinion dated Dec. 14, 2016 related to International Appl No. PCT/IB2016/001527.

\* cited by examiner

SYSTEM AND METHOD FOR HUMAN PERSONALITY DIAGNOSTICS BASED ON COMPUTER PERCEPTION OF OBSERVABLE BEHAVIORAL MANIFESTATIONS OF AN INDIVIDUAL

FIELD OF INVENTION

The present invention relates to the field of information technology, including, more particularly, to systems and techniques predicting personality based on data generated from multiple data sources.

BACKGROUND

A person's digital behavior, such as text messaging or social media posts, can be used to accurately predict a range of personal attributes, such as sexual orientation, ethnicity, religious and political views, personality traits, intelligence, happiness, use of addictive substances, parental separation, age and gender. The predicted personality attributes derived from a person's digital behavior can influence many commercial, non-commercial and personal activities. However, collecting, mining, and analyzing all the data associated with a person to determine the person's personal attributes is a challenge.

For example, retailers frequently use personality attributes of a customer to generate personalized product/service suggestions. Customer profile data, demographic data, point of contact data, and transaction data are analyzed to generate advertising content or product suggestions that presented to individual customers to increase the likelihood that the customer will purchase the goods or services presented. However, retailers do not utilize all of the potential dynamic customer data that may be available for generating customized products/services targeted to individual customers.

In another example, many technology companies collect a variety of personal data from customers using computing devices of the technology companies, such as location details, address book contacts, calendar information, etc. But because of the massive scale generation of personal data, most of the data cannot be effectively used. In other words, to explore, analyze, and extract useful information and knowledge from the deluge of personal data, one has to leverage these devices as the data-mining platforms in ubiquitous, pervasive, and big data environments. Similar to retailers, technology companies are also not able to utilize all of the customer data that is available for generating customized products/services targeted to the individual customer.

In particular, the majority of current solutions are based on statistical analysis of Big Data related to the behavior patterns of customer groups. For example, the statistical groups of customers are determined based on social, demographic, cultural and other characteristics. This creates only an illusion of personalization as there is no individual human being in the center of that type of targeting. Products and services are aimed to satisfy the needs of an average abstract customer without taking into account personal temperament, values, needs and preferences of every individual customer.

Another problem is that statistical approach to targeting forces retailers to invest their efforts, time and money into selling what they have in stock as a result of statistically based procurement rather then what every particular customer really needs. Advertising campaigns do not simply inform customers about goods and services available to them. Their aim is to make statistical groups of impersonalized average abstract customers believe that they need what a retailer has to offer.

What is needed is precise individual targeting by the means of fully-automated computer perception of observable behavioral manifestations of an individual and further diagnostics of personal traits based on a large number of symptoms registered by the system. In other words, what is needed is an automated system to take into account the individual personalities of each consumer and to offer each consumer a precisely targeted product and/or service.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

The present invention relates to automated system and method for human personality diagnostics based on computer perception of observable behavioral manifestations of an individual.

Human personality is a complicated multilayer structure of measurable personality traits that may be represented by normalized personality scales which indicate the strength of manifestation of a personality trait of a person. The benefit of using personality scales when performing human personality diagnostics is that personality scales allow for the adoption new personality scales without affecting (or invalidating) results of previous human personality diagnostics. The structure of human personality can be stored and represented as an ontological graph, which describes the personality scales, methodologies, cognition channels, perception invariants (also referred to as diagnostic features) and all the relations between them.

Personality scales may be generated for a particular person by collecting input data from a variety of source devices. The platform for computing the personality scales receives the input data and parses the data through computer perception channels, which can be any of audio, video, textual and other way of registering observable behavioral manifestations of an individual. Depending on the type of channel the input data goes through (i.e. audio, video, textual, etc.) an appropriate method of analysis is applied to generate observable behavioral manifestations. For example, an audio/visual data may be processed using computer vision, computer hearing or natural language processing algorithms. The observable behavioral manifestations may be used to extract diagnostic features or invariants, which are digitized measurable representations of behavioral aspects of the person. There are many different types of invariants that may be extracted. In an example, that is not meant to be limiting, the invariants may include:

- anthropological, such as physical measurements of facial features, body complexion, height and etc.;
- appearance, including beard, mustache, hair, tattoo, piercing, body modifications and so on;
- kinematics: poses, gestures, interactions with other objects;
- mimics, facial expressions and micro movements of muscles on the face;
- context: identification of background on photo and video or obtained by other means knowledge of the context;
- linguistic Invariants, which describe how the person formulates his/her thoughts;
- prosodic, which demonstrate emotions and other traits through the way a person speaks;
- ethnicity, age, gender, culture and other cultural and socioeconomic strata.

In one embodiment, the personality scales for the person may be generated by applying a predictor to a subset of invariant data available to the system. For example, a retail security system may want to generate profiles for people that enter an establishment with the intention to shoplift. The security camera may provide video data of each person in the establishment. Anthropological, appearance, kinematics, mimics and context invariants may be derived from the video data. However, to determine if a person is displaying shoplifting tendencies, the platform may only apply a predictor to the kinematics, mimic, and context invariants that will be used to generate a personality scale.

Personality scales obtained from the predictor may be stored as a personal profile. The personal profile is a unique description of the personality of an individual. However, the personal profile's main value is not in the profile itself, it's in the knowledge that can be inferred from the personality scales that are stored in the personal profile. The use of the personal profile comprising personality scales has many applications. In an example, not meant to be limiting, a personal profile may be used to generate:

- individual recommendations on personal development;
- individual recommendations on career and education;
- person-to-person matching in dating and family relations;
- person-to-person matching in sales and services;
- product-to-person matching;
- communication strategy recommendations;
- building adaptive software and hardware UI/UX interfaces that adjust to personality or emotional reactions of a user;
- implementing artificial personality in communication agents, devices, robots and etc.; and
- predicting human behavior in security and other applications.

Figure 1:
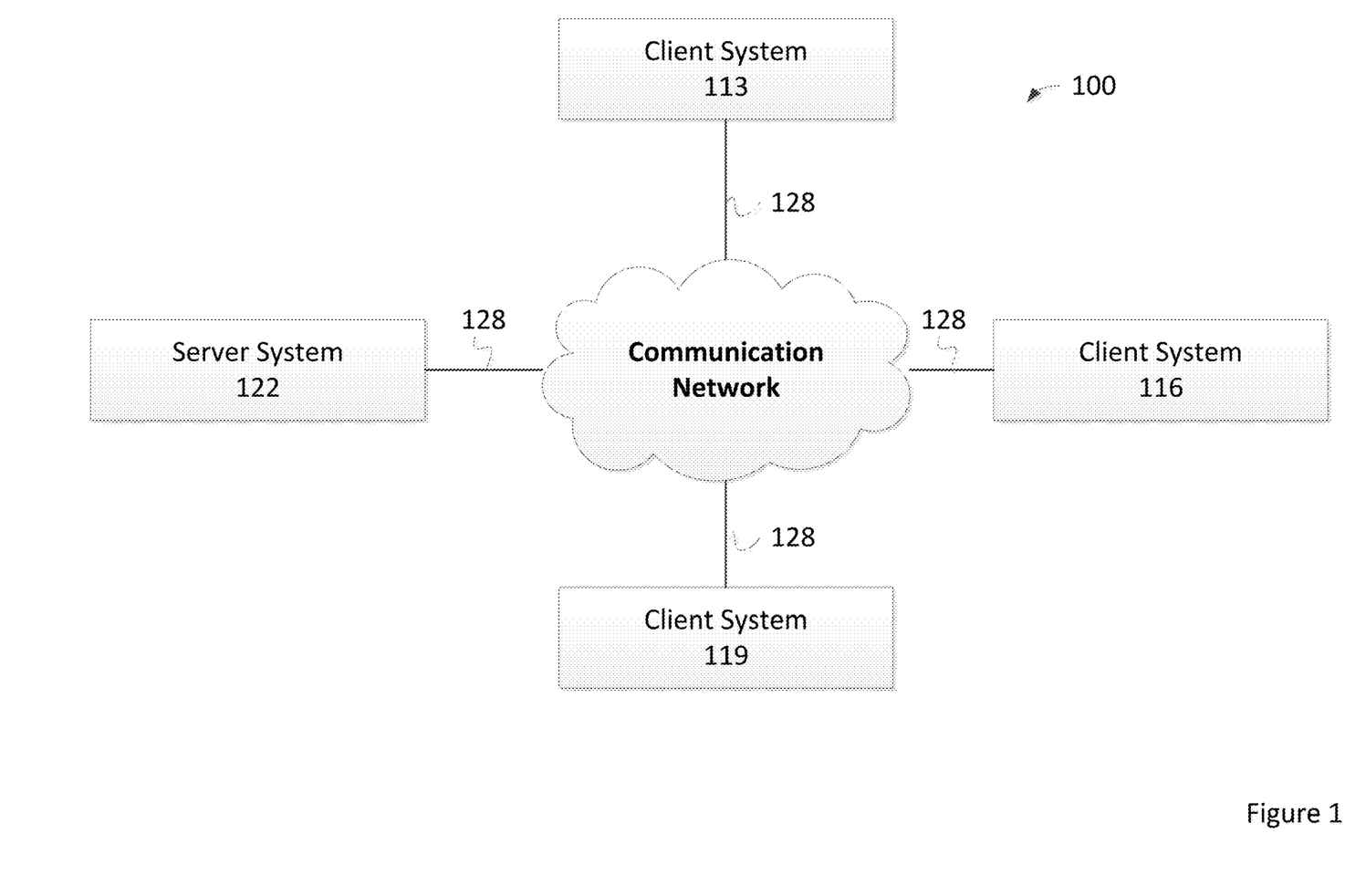
FIG. 1 shows a block diagram of a client-server system and network in which an embodiment of the invention may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client and a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

The client or server system may use a user interfaces with the system through a computer workstation system. The client or server system may includes a monitor, screen, cabinet, keyboard, and mouse. Mouse may have one or more buttons such as mouse buttons. Cabinet houses familiar computer components, some of which are not shown, such as a processor, memory, mass storage devices, and the like.

Mass storage devices associated with the client or server may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device. The source code of the software may also be stored or reside on mass storage device (e.g., hard disk, magnetic disk, tape, or CD-ROM). As a further example, code may be transmitted via wires, radio waves, or through a network such as the Internet.

Figure 2:
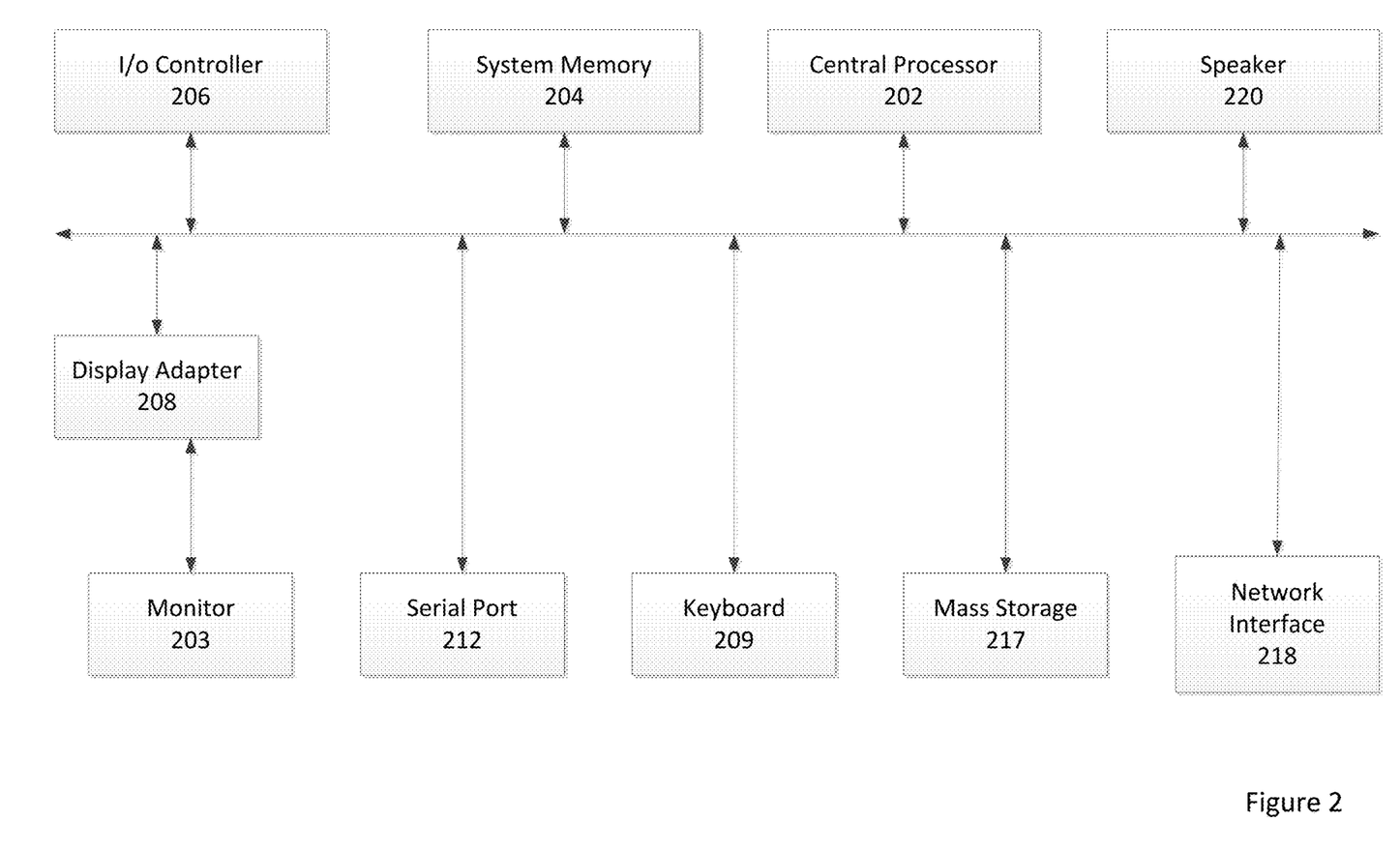
FIG. 2 shows a system block diagram of a client computer system which may be used in an implementation of the invention.

FIG. 2 shows a system block diagram of a computer system, such as the client or server systems. The computer system includes monitor 203, keyboard 209, and mass storage devices 217. Computer system 201 further includes subsystems such as central processor 202, system memory 204, input/output (I/O) controller 206, display adapter 208, serial or universal serial bus (USB) port 212, network interface 218, and speaker 220. In an embodiment, a computer system includes additional or fewer subsystems. For example, a computer system could include more than one processor 202 (i.e., a multiprocessor system) or a system may include a cache memory.

Arrows, as illustrated in FIG. 2, represent the system bus architecture of computer system 201. However, these arrows are illustrative of any interconnection scheme serving to link the subsystems. For example, speaker 220 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 3A:
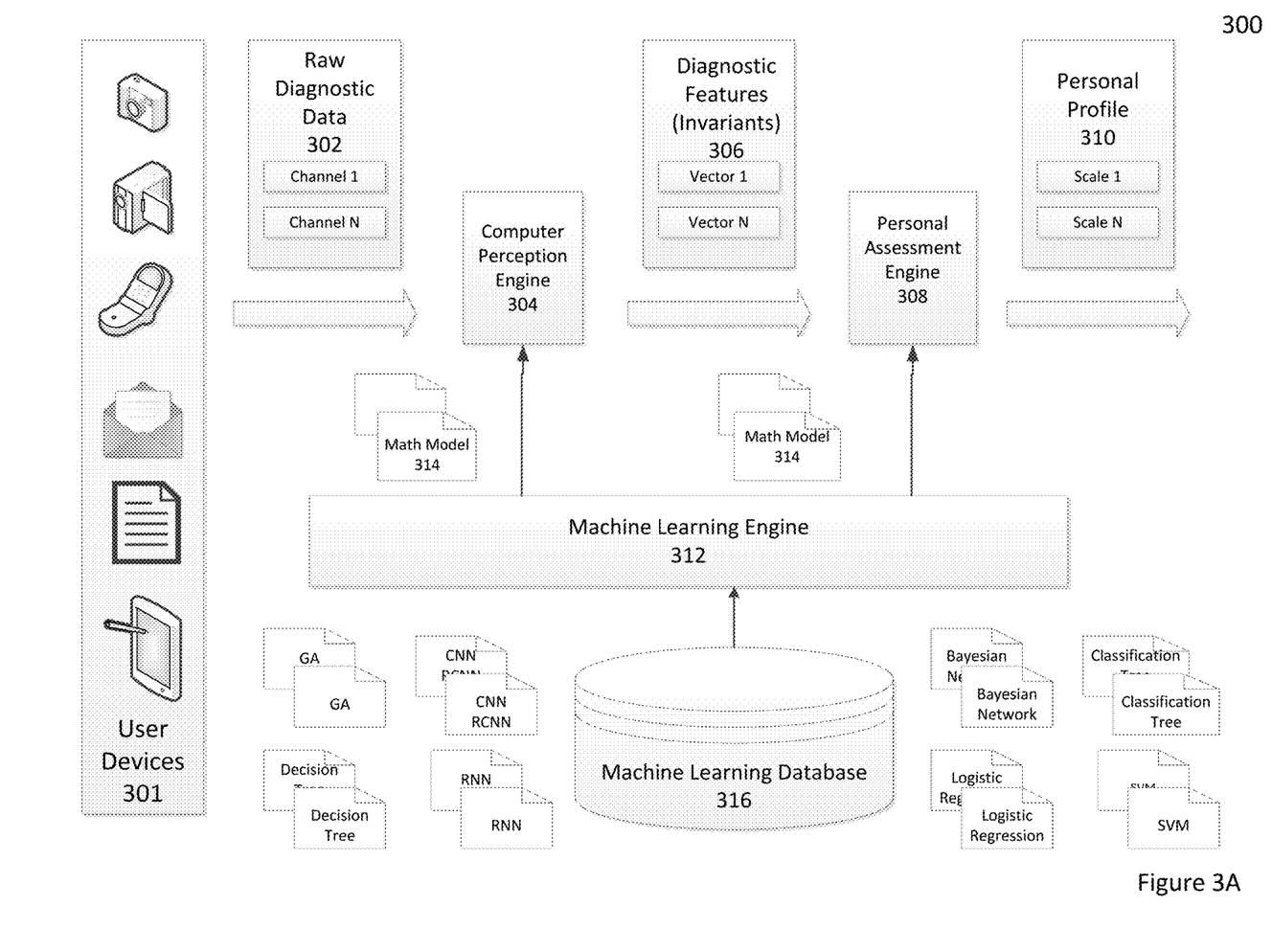
FIG. 3A shows a block diagram of a high level view of a data processing system for analyzing raw data associated with a customer to generate a personal profile in an implementation of the invention.

Referring now to FIG. 3A, a block diagram of a high level view of a data processing system for analyzing raw data from a plurality of computing devices associated with a user to generate personal profile is shown in accordance with an illustrative embodiment.

A computer perception engine 304 receives data from a variety of user computing devices 301 associated with a user. The raw data 302 that is collected by the system may include user event data, user behavior data, any available internal data and/or external data regarding the user, as well as any social or demographic data related to statistical groups the user belongs to. The data gathered by the system is referred to as raw data and will be described in greater detail below with reference to FIG. 6.

The raw data 302 may be received from a variety of sources. In one example, not meant to be limiting, the raw data 302 that is collected includes any audio-visual data, textual data, database data, and the like. The system may process the raw data 302 using different layers of abstraction to hide all but the relevant data in order to reduce complexity and increase efficiency. In one embodiment, once the raw data 302 is received by the system, the raw data 302 may be normalized during a pre-processing stage, so that the raw data 302 is formatted in a standardized fashion. Pre-processing of data is an optional layer in the data flow, which relates to preparation of raw data for the analysis. This can be for example, filtering of the audio signal to ensure high quality of speech-to-text translation or removing artifacts in the video channel.

Once the data 302 has been pre-processed, the data 302 can be separated according to the type of data. For example, audio/video data that is received from a video teleconference may be transmitted to the computer perception engine 304 so that the audio data can be processed separately from the video data. The data may also be analyzed to determine if the data is incorrect, so corrections may be made in the pre-processing of the data. For example, all audio data collected may be sent through channel 1, while all video data collected may be sent through channel 2.

The computer perception engine 304 receives unstructured data from any sources that are available at the time of diagnostics. In one embodiment, the user devices 301 are monitored continuously or on a periodic basis to gather raw diagnostic data 302. In another embodiment, the raw diagnostic data associated with user devices 301 are transmitted to the system only at the time of a diagnostic. Additionally, an application on each of the user device 301 may compile the raw diagnostic data and transmit it to the system periodically or at the time of a request or the system may monitor the devices by crawling through the user devices and media accounts associated with the user. For example, the system may monitor an e-mail platform associated with the user to gather e-mail data 302 or the system may crawl through a user's social media services to gather social media data 302. In some cases, the system would have to rely only on data that it can extract from a photo; and in other cases, there may be a recording of a call available for analysis. Raw data 302 can also include, but is not limited to, customer behavior data gathered from cookies, statistical data form BigData databases, video recordings from surveillance cameras, Instagram photos, texts, photos, videos posted in social networks and so on.

In one embodiment, the system may process the raw data 302 through different layers of abstraction. The data, at each layer of abstraction, is processed independently such that one layer has no knowledge of what happened on the other layers. This ensures flexibility and scalability of the system. For example, to process the results of diagnostics, it is not necessary to know where the raw data came from and what type of content the Platform processed prior to compiling the personal profile. The raw diagnostic data could come from a photo, a post and/or behavior pattern in a social network, a call to a call-center, a video conferencing conversation or through any other communication channel.

In one of the initial steps in the data abstraction, the raw data 302 is transmitted to the computer perception engine 304 through channels associated with data types. Depending on the type of raw data channel the raw data may go through more than one perception channels in parallel. For example, a video stream would be dispatched to a set of visual analyzers, speech-to-text, semantic and prosodic analyzers and etc. depending on the current perception capabilities of a particular implementation of the system. The machine learning database 316 stores the mathematical models which can be applied to raw data depending on the type of input channel. The mathematical models are retrieved or transmitted from the machine learning storage 316 to the computer perception engine 304 through the machine learning engine 312. These mathematical models implement known algorithms used in computer vision such as convolutional neuro networks, natural language processing, such as recurrent neuro networks and so on.

The machine learning models may be trained using data received from the users of the system. The models may be trained periodically or continuously. The models may be trained using social data that the system has collected. The machine learning model further correlate the personal profile obtained from one source with a second personality profile obtained from other sources.

New computer perception services can be easily added by simply configuring the data flow and storing an implementation of a new mathematical model in the machine learning storage 316 of the machine learning engine 312. It can be appreciated that the machine learning storage 316 may be a plurality of storage devices or a single storage device. In one embodiment, the machine learning storage 316 may be an cloud based storage.

The computer perception engine 304 parses the raw data using the mathematical model stored in the machine learning database 316, wherein parsing the raw data relates to an automated processing of raw data with various cognition algorithms and methods. For data dispatched to a visual cognition channel, for example, these can be convolutional neural networks or other methods of computer vision. The result of parsing is a hierarchical structure of diagnostic features (referred to as invariants) 306. At this layer every invariant 306 has a digital value. For example, an invariant describing a person wearing a tie would look like "hasTie=1", an invariant describing the width of left eye in pixels would be "leftEyeWidth=38". Although these invariants have digital values they have no useful meaning for the diagnostic system yet.

At the data correction layer the digitized Invariants 306 get normalized and converted into a set of values that can be processed by mathematical algorithms used for diagnostics. At this stage corrected invariants can take the values that represent a class id, a Boolean value or a normalized real value from 0 to 1. Additional attributes such as probability, certainty, quality of service and so on may also be associated with invariants.

The output 306 of the computer perception engine 304 is a complex ontological structure containing vectors of diagnostic features referred to as vectors of invariants 306. Each vector of invariants 306 represent the meaning gathered by the computer perception engine 304 from one raw data channel 302 with one mathematical model. Different models can be applied to a single channel obtaining more than one vector of invariants from it. In an example, not to be limiting, a single photo can produce the following vectors of invariants:

Anthropological: facial features, for example, leftEyeWidth, leftBrowWidth, . . .
Anthropological: body characteristics (bodyHeight, bodyComplexion, . . . )
Appearance: visual presentation (hasTie, hasLongHair, . . . )
Kinematics: poses, gestures (poseSitting, gestureHandshake, . . . )
Interactions: interactions with other people and objects
Many more.

The corrected, normalized and structured data go to the layer referred to as analysis of diagnostic data implemented in the personal assessment engine 308. This layer implements a vast number of mathematical algorithms used in computer diagnostics, such as Bayesian networks, classification trees, logistic regression, neural networks, support vector machines and etc. These algorithms take invariants as an input and produce psychometric scales as a result of personal diagnostics. The diagnostic algorithms are also stored in the ML storage 316 and are dispatched by the ML engine 312.

The personal assessment engine 308 takes diagnostic features as an input and returns an ontological structure containing personality scales obtained as a result of automated diagnostics. Personality scales, also known as psychometric scales, represent a model of a user's personality and can be used by other modules of the system to predict user's behavior in certain situations, to configure products and services targeted exactly at his needs and to issue recommendations to managers about the most effective communication strategies. The personality scales generated for a user are used to create the personal profile 310 for the user.

In one embodiment, the personal profile 310 can be matched with product/services offers which were previously described in terms of product characteristics. Matching the personal profile of a user with a product or service and generating recommendations for the user is described in detail in FIG. 3B.

Figure 3B:
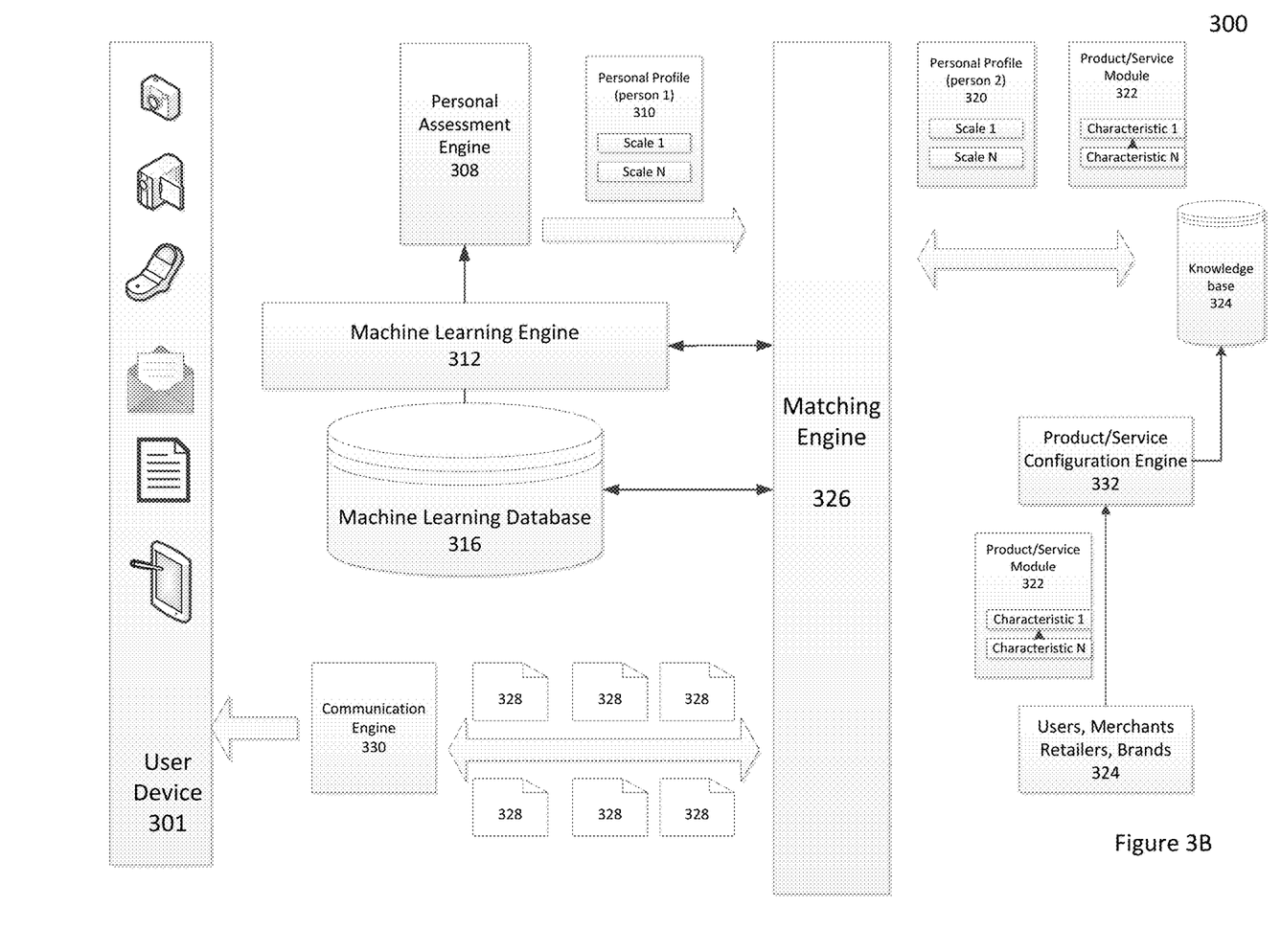
FIG. 3B shows a block diagram of a high level view of a data processing system for analyzing information in a personal profile associated with a customer to generate customer specific product/service recommendations in an implementation of the invention.

Referring now to FIG. 3B, a block diagram of a high level view of the data processing system for analyzing raw data from a plurality of computing devices associated with a user to generate personal profile is shown in accordance with an illustrative embodiment.

Matching engine 326 uses known mathematical algorithms to find the best match between personal profile scales and product characteristics. The matching engine 326 receives a user's personality profile from the personal assessment engine 308 and a product/service characteristics from the knowledge base 324.

In one embodiment, companies 324 may provide the system with products or services to recommend to users of the system. For example, merchants or retailers may provide the system with products or services which to recommend to the users. Characteristics of the products or services 322 are determined and passed to the product configuration engine 332 which stores the characteristics of the products and services in a knowledge base 324. Additionally, the system may store the generated personal profiles of all the users of the system in the knowledge base 324.

In other embodiment of the system, personal profiles of two or more persons can be matched with each other to find the best match for personal relations or professional communication. The system can also match personal profiles with job competencies, career and education strategies, corporate values and etc.

The matching engine 326, using the mathematical models retrieved from the machine learning database 316 via the machine learning engine 312, generates a correlation between a product, service or profile and a user's personal profile based on the user's personality scale. In one embodiment, the matching engine 326 may request the mathematical model or models directly from the machine learning database 316.

The communication engine 330 is responsible for communicating the result of personal diagnostics to the customer in the most effective way according to his personal profile. For example, if the customer is buying a sports car from a car dealer for one customer the most effective way to present a recommendation would be to mention celebrities who also bought the same make and model while for another customer the most successful communication would be to focus on the innovative features, acceleration, speed and etc. Using the abstraction processing of the raw behavioral data of the user, the matching engine is able to quickly ascertain behavior characteristics of the user, such as likes and dislikes, and recommended items for the user. In one embodiment, the matching engine is able to ascertain in real-time recommendations for the user because of the efficiency of the abstraction process of the raw data.

Figure 4:
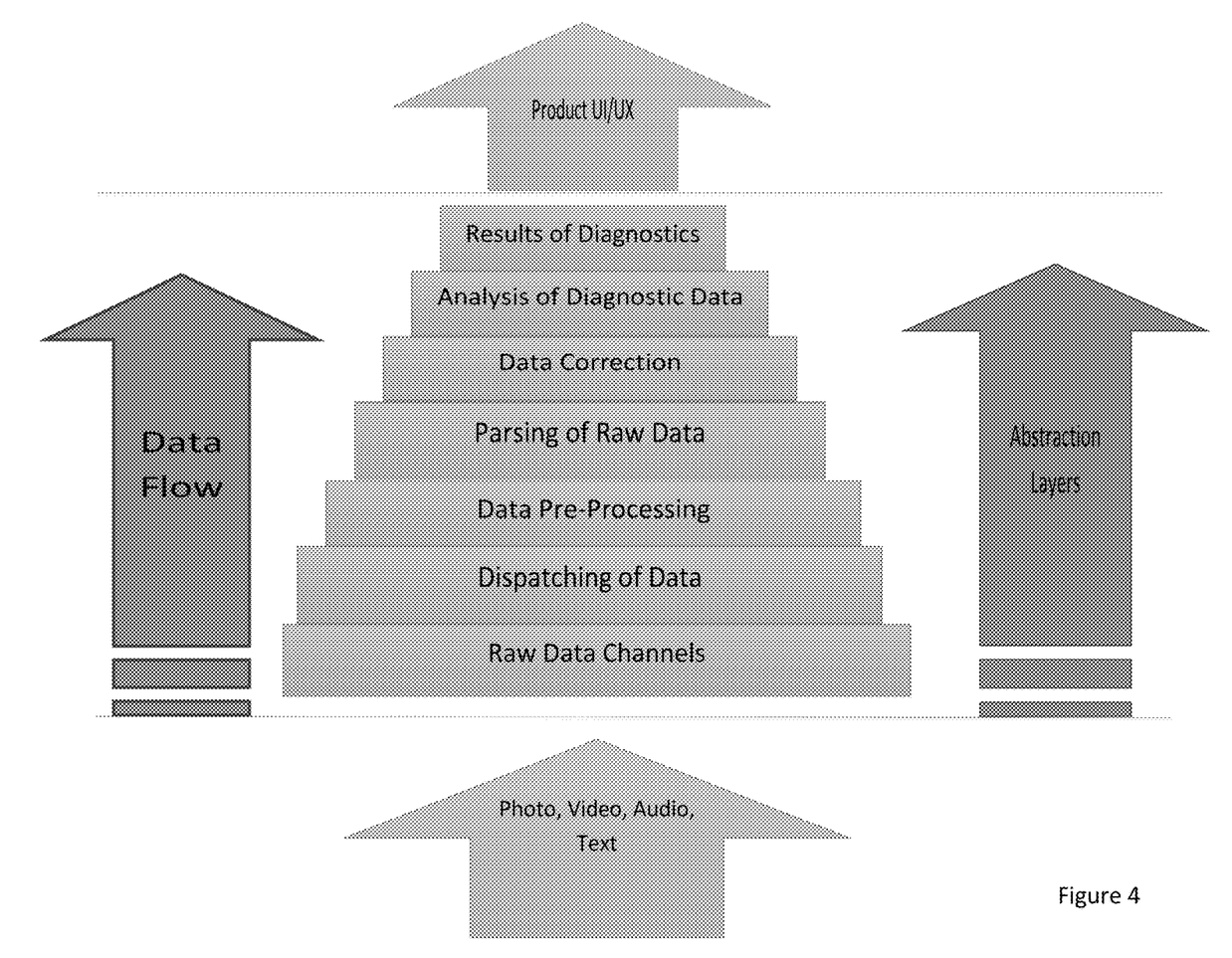
FIG. 4 shows the different layers of abstraction used to process raw data in an implementation of the invention.

FIG. 4 illustrates the use of abstraction layers to generate a personal identity profile. Data at each layer of abstraction is processed independently such that one layer has no knowledge of what happened on the other layers. This ensures flexibility and scalability of the system. For example, to process the results of diagnostics, it is not necessary to know where the raw data came from and what type of content the Platform processed prior to compiling the personal profile. The raw diagnostic data could come from a photo, a post and/or behavior pattern in a social network, a call to a call-center, a video conferencing conversation or through any other communication channel.

Raw data coming from raw data channels get dispatched to appropriate computer perception channels to ensure that an appropriate method of analysis is applied to a particular set of raw data. Depending on the type of raw data channel the raw data may go through more than one perception channels in parallel. For example, a video stream would be dispatched to a set of visual analyzers, speech-to-text, semantic and prosodic analyzers and etc. depending on the current perception capabilities of a particular implementation of the system. New computer perception services can be easily added by simply configuring the data flow.

Pre-processing of data is an optional layer in the data flow, which relates to preparation of raw data for the analysis. This can be for example, filtering of the audio signal to ensure high quality of speech-to-text translation or removing artifacts in the video channel.

Parsing of raw data relates to automated processing of raw data with various cognition algorithms and methods. For data dispatched to a visual cognition channel, for example, these can be convolutional neural networks or other methods of computer vision. The result of parsing is a hierarchical structure of diagnostic features (referred to as Invariants). At this layer every Invariant has a digital value. For example, an invariant describing a person wearing a tie would look like "hasTie=1", an invariant describing the width of left eye in pixels would be "leftEyeWidth=38". Although these invariants have digital values they have no useful meaning for the diagnostic system yet.

At the data correction layer the digitized Invariants get normalized and converted into a set of values that can be processed by mathematical algorithms used for diagnostics. At this stage corrected invariants can take the values that represent a class id, a Boolean value or a normalized real value from 0 to 1.

Corrected and normalized data go to the layer referred to as analysis of diagnostic data. This layer implements a vast number of mathematical algorithms used in computer diagnostics, such as Bayesian networks, classification trees, logistic regression, neural networks, support vector machines and etc. These algorithms take invariants as an input and produce psychometric scales as a result of personal diagnostics.

Personality scales, known also as psychometric scales, represent a model of a customer's personality and can be used by other modules of the system to predict customer's behavior in certain situations, to configure products and services targeted exactly at his needs and to issue recommendations to customer managers about the most effective communication strategies.

The self-learning engine can also collect data available through the Internet and seek correlations between psychometric scales obtained through different cognition channels so that the diagnostic models get constantly improved without any expert knowledge necessary. For example, in one embodiment the system can assess the level of extraversion of a random person based on his profile photo in a social network and then measure the same by analyzing texts, likes and other behavior patterns of the same person. Positive correlations add up to the diagnostic model while negative correlations trigger automatic recalculation of the model.

Figure 5:
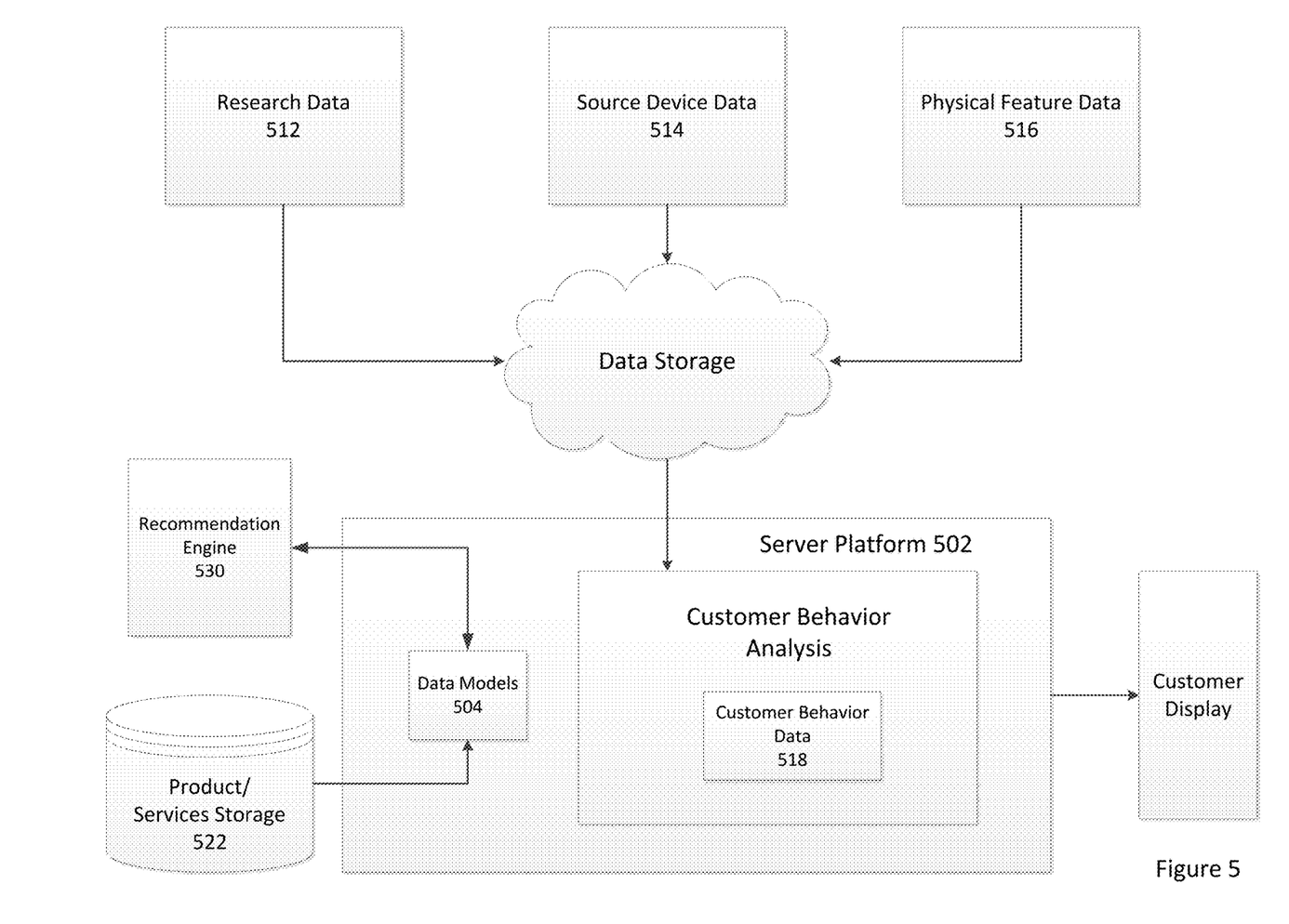
FIG. 5 shows a block diagram of another embodiment of the data processing system described in FIG. 4 in accordance with an illustrative embodiment.

Referring now to FIG. 5, a block diagram of another embodiment of the data processing system described in FIG. 4 in accordance with an illustrative embodiment. Data associated with the customer includes customer event data, customer behavior data, and any available internal data and/or external data regarding the customer.

Server platform 502 is any type of known or available server for analyzing dynamic customer data for use in generating custom product/service suggestions. Server platform 502 includes set of data models 504 for analyzing dynamic customer data and static customer data.

Static customer data is data that does not tend to change in real time. Examples of static data elements include a customer's name and address. Dynamic customer data is data that is changing in real-time. For example, dynamic customer data could include, without limitation, customer behavior and psychometric data extracted from photos, voice data from a call, a skype conversation, a video or the like.

The static and dynamic data may be gathered from a research data source 512 where data associated with a customer that is pre-generated and/or data that is gathered from research. For example, research data may include data received from market researchers that define a demographic. For example, research data 512 includes, but is not limited to, demographics data, personality types, psychographic data, transactional history data, current actions data, and/or profiled past data. Research data can be retrieved from crawling the internet or receiving data from transactions from the user. For example, research data may include that a user having a child is more likely to be interested in products or services related to diapers or formula.

Source device data 514 is data gathered by one or more detection devices. In one embodiment, source device data 514 includes information gathered from telephone conversations with a call center, e-mail exchanges, chat messages and any other communication with a call center. Source device data 514 may also include social media data associated with the customer. The social media data may also include photographs, information from news feeds or posts, blog entries, etc.

Customer physical feature data 516 describes events associated with a customer. The system may gather the customer physical feature data from video/pictorial information gathered from camera's at a retail store. As used herein, an physical feature data may include an appearance of a customer or accessories associated with the customer, such as a customer's clothing, jewelry, handbag, umbrella, or other accessories. Other physical feature data may also include:

Anthropological, such as physical measurements of facial features, body complexion, height and etc.

Appearance, including beard, mustache, hair, tattoo, piercing, body modifications and so on.

Kinematics: poses, gestures, interactions with other objects,

Mimics, facial expressions and micro movements of muscles on the face,

Context: identification of background on photo and video or obtained by other means knowledge of the context, Linguistic Invariants, which describe how the person formulates his/her thoughts, Prosodic, which demonstrate emotions and other traits through the way a person speaks Ethnicity, age, gender, culture and other features In one example, live video feeds or single frames taken from a surveillance camera may be processed by a security surveillance camera. Using the system described within, the live video feeds and or single frames may be analyzed to flag certain behaviors or appearance of an individual, such as a nervous gesture of a customer looking around suspiciously.

The physical feature data may also include a customer's action or pattern of actions, such as a customer selecting items within a particular area of the retail facility, the amount of time the customer is in a particular area, or if the customer is pacing around a particular item. The physical feature data may also include the customer's mode of transportation, the customer's interactions with people outside of the retail facility, or mannerisms prior to entering the facility. For example, an event could include data indicating that the customer has rode his bike to the retailers business establishment. The characteristics of the bike and the physical appearance of the bicycler may be determined using audio and/or video images of security cameras of the business establishment.

In one embodiment, the physical feature data, as described above, may trigger the system to generate a personal profile on the individual associated with a trigger event. For example, the physical feature data such as a customer picking up an item, putting the item back, and picking up the item again may trigger a notification event, wherein a store clerk is notified to assist the customer.

Using the system described within, the live video feeds and or single frames may be analyzed to flag certain behaviors or appearance of an individual, such as a nervous gesture of a customer looking around suspiciously. The flagged data may be stored or processed as customer physical feature data 516. Customer physical feature data 516 may be further processed, filtered, and/or analyzed to identify patterns of events that may indicate a customer's shopping preference to form customer behavior data 518. In other words, customer behavior data 518 is a set of data describing events, behaviors, and appearance of a customer or belongings of the customer that indicates a significant or relevant pattern suggesting a shopping preference. Customer behavior data 518 may also include those patterns selected from customer physical feature data 516 that indicates a potential shopping preference.

In one embodiment, customer behavior data 518 is further processed to form dynamic data. In this example, processing customer behavior data 518 may include, but is not limited to, filtering customer behavior data 518 for relevant data elements, comparing customer behavior data 518 to baseline or comparison models for customer behavior and/or patterns of events 520, and/or formatting customer behavior data 518 for utilization and/or analysis in one or more data models in set of data models 504 to form the dynamic data.

Set of data models 504 may be used to analyze customer data objects for personalizing the content of marketing messages presented to the customer. Set of data models 504 includes one or more data models for identifying customer data objects and determining relationships between the customer data objects. Set of data models 504 are generated using statistical, data mining, and simulation or modeling techniques.

Applying the set of data models 504 to the customer behavior data 518 may yield a personal profile for the customer. This personal profile may be generated in real-time. The profile is then used to generate a recommendation of a product/service offer based on the mood of a customer, determine intentions of a potential shoplifter, or the like by applying data models to the personal profile. In one embodiment, a report may be generated based on the results of applying the data model to the personal profile.

In another example, processing customer behavior data 518 to form dynamic data includes processing customer behavior data 518 with any available research data 512 and/or source device data 514. In this example, processing customer behavior data 518 may include, but is not limited to, filtering customer behavior data 518 for relevant data elements, combining customer behavior data 518 with research data 512 and/or source device data 514, comparing customer behavior data 518 to baseline or comparison models for external data 514 and/or research data 512, and/or formatting customer behavior data 518 for utilization and/or analysis in one or more data models in set of data models 504 to form the dynamic data. The processed customer behavior data 518 and any available research data 512 and/or source device data 514 forms dynamic data. The dynamic data is analyzed and/or further processed using one or more data models in set of data models 504.

Processing the dynamic data may include, but is not limited to, identifying a set of product/service suggestion criteria for the customer. This may be accomplished using any known or available method for identifying products or services for a target customer. The processing of dynamic data may also include individual recommendations on personal development, in individual recommendations on career and education, person-to-person matching in dating and family relations, person-to-person matching in sales and services, product-to-person matching, communication strategy recommendations, building adaptive software and hardware UI/UX interfaces that adjust to personality of a user, implementing artificial personality in communication agents, devices, robots, predicting human behavior in security and other applications, and the like.

Product/Services Storage 522 is any type of known or available server for storing information associated with various product and service 524. Based on the information associated with the various products and services, a single product/service or multiple products/services can be displayed to the customer. In one embodiment, product/services in the Product/Services Storage 522 can be quickly and dynamically assembled and disseminated to the customer in real-time. Transmitting or disseminating the customized products/services to a display device associated with the customer for display to the customer in real-time refers to something that occurs immediately as or within some period of time needed to achieve the objective of using real-time display.

In this illustrative example, customized products/services 524 are pre-generated. In other words, products/services 524 are preexisting products/services that are created prior to analyzing customer behavior data 516 and any available internal data 612 and/or external data 614 associated with a customer using one or more data models to generate a personalized product/service for the customer. Two or more products/services may be combined to dynamically generate a customized product/service 530. Customized product or service 530 is customized or personalized for a particular customer.

Figure 6:
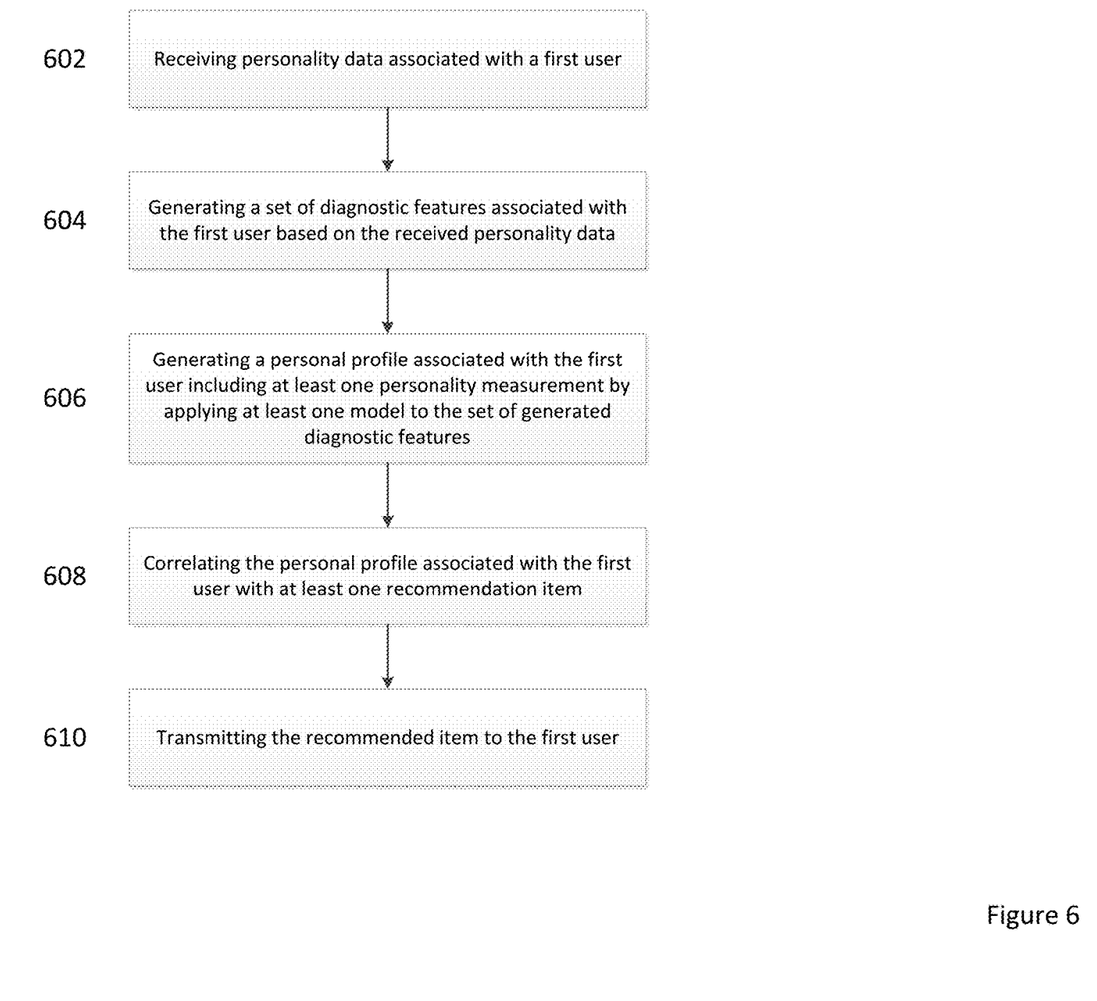
FIG. 6 shows a process flow of a method of generating customer specific product/service recommendations based on collected raw data associated with a customer in an implementation of the invention

FIG. 6 is a flowchart that illustrates a method of generating user specific recommendations. Flowchart 300 illustrates method acts illustrated as flowchart blocks for certain steps involved in and/or between the clients and/or the servers of FIGS. 3A and 3B.

At step 602, the platform for generating recommendations receives personality data associated with the first user. In one embodiment, the recommendations may be generated based on a request from a user or another party. In another embodiment, the recommendation may automatically be generated based on the occurrence of an event. For example, based on the event that a user turns on a music app on his or her mobile device, music suggestions may be recommended to the user that match the user's current mood.

As described above, the data can be received from a various source devices associated with the user and/or from crawling or monitoring social media networks associated with the user. The data that is received is processed through various abstraction layers. The data, at each layer of abstraction, is processed independently such that one layer has no knowledge of what happened on the other layers. This ensures flexibility and scalability of the system. For example, personality data in the form of a chat message, an e-mail message, a text message, a post in a social network or a speech transcript may be obtained from a speech-to-text application from one of the plurality of source devices associated with the first user.

At step 604, the platform generates a set of diagnostic features, also known as invariants, based on the received personality data. The invariants are digitized, measurable representations of behavioral aspects of the person. There are many different types of invariants that may be extracted. For example, when determining a set of diagnostic features, the platform may use at least one of referencing a sentiment dictionary and counting a number of words in text data with positive sentiment. Further, the platform may determine a mood of the first user based on the number of words in the text data with positive sentiment or determine psychometrics of the first user based on at least one of grammar patterns, syntactic patterns and speech patterns extracted from the personality data or determine psychometrics of the first user based on patterns of multimodal communication, the patterns of multimodal communications including speech patterns, mimics and gestures extracted from the personality data.

At step 606, the platform generates a personal profile associated with the first user and stores the personal profile in a storage associated with the platform. The personal profile comprises personality measurements by applying at least one mathematical model to the set of generated diagnostic features. In one embodiment, the personality measurements are personality scales. The personality scales indicate the strength of manifestation of a personality trait of a person. The benefit of using personality scales when performing human personality diagnostics is that personality scales allow for the adoption new Personal Scales without affecting (or invalidating) results of previous Human Personality diagnostics. The structure of human personality can be stored and represented as an ontological graph, which describes the Personal Scales, Methodologies, Cognition Channels, Perception Invariants (Diagnostic Features) and all the relations between them.

Using the generated personality measurements, at step 608, the platform correlates the personal profile associated with the first user with at least one recommendation item. The recommendation item may be a product, service, profile or any other form of recommendation information, such as a strategy or a class. In a non-limiting example, recommended items may include, product/service recommendations, personal matching recommendations, career/education recommendations, communication strategies, personal development strategies, or adaptive UX/UI settings and strategy.

When correlating the personal profile with at least one recommendation, the platform may determining at least one correlation between personality scale of the personal profile and at least one of anthropological features, characteristics of appearance, cinematics, mimics, facial expressions, micromovements of muscles on the face, context of the personal data, linguistic characteristics, prosodia, social characteristics, and demographic characteristics.

In one embodiment, the correlation may determine a match between the at least one psychometric measurement in the personal profile associated with the first user and at least one of a characteristic associated with a product, a characteristic associated with a service, and a psychometric scale associated with a second user.

In another embodiment the platform server may receive a request for a strategy to achieve a goal associated with the first user, the goal being associated with at least one of a personal development, a career, a business, and a personal relation. In this case, the at least one recommendation item transmitted to the first user is the strategy to achieve the goal.

In another case, the platform may correlate the personal identity profile for the first user with at least a second user, generate a recommendation for the first user on at least one communication strategy to at least one goal, the at least one goal being determined from a communication with the at least second user, and generate a second recommendation for the at least second user on at least one other communication strategy to achieve at least another goal, the at least another goal being determined from a communication with the at least second user in communication with the first user.

Once the platform has determined recommended items, the recommended items may be transmitted to at least one of the user devices, in step 610. In one embodiment, the device the user used to request the recommendation or the device in which the event occurred requiring the recommendation is the device that receives the recommendation. In another embodiment, the recommendation may be transmitted to a third party.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer-executable method for providing recommendations digital behavior of the first user corresponding to the use of each of a plurality of source devices by a first user, the method comprising:

receiving, at a platform server from each of the plurality of source devices, personality data of the first user, the received personality data representing digital behavior of the first user including at least one of text data, video data, image data, and audio data generated by the use of each of the source devices by the first user and including social media data generated by crawling social media content associated with the user, the received personality data being unstructured data;

abstracting, at the platform server, the received personality data using a plurality of data abstraction layers, wherein each data abstraction layer processes the received personality data independently of other data abstraction layers, the plurality of data abstraction layers including:

a first abstraction layer, wherein the first abstraction layer transmits the received unstructured personality data through a plurality of data channels simultaneously based on data types associated with the personality data, wherein the plurality of data channels process the received unstructured personality data, the data channels including (i) a text channel that filters and corrects the text data for grammatical errors, (ii) a video channel that removes digital artifacts from the video, (iii) an image channel that removes digital artifacts from the image data, and (iv) an audio channel that enhances the audio data and applies speech recognition to the enhanced audio data; and a second abstraction layer, wherein the second abstraction layer generates, at the computer perception engine associated with the platform server, a set of observable behavior manifestations by parsing the processed personality data from the plurality of data channels using a mathematical model associated with the data channel the received personality data was transmitted through, each of the mathematical models being machine learning models that are trained using the processed personality data; and a third abstraction layer, wherein the third abstraction layer generates, at the computer perception engine, a set of diagnostic features associated with the first user by (1) extracting invariants from each of the observable behavior manifestations in the set of observable behavior manifestation, the extracted invariants being measurable representations of behavioral aspects of the first user represented within the text data, video data, image data, and audio data, and (2) normalizing and converting the extracted invariants into a set of values that include at least one of a representation of a class id, a Boolean value, or a normalized real value from 0 to 1, the set of values being the set of diagnostic features associated with the first user;

transmitting, by the computer perception engine, the set of diagnostic features to a personal assessment engine associated with the platform server;

generating, at the personal assessment engine, a personality profile associated with the first user including at least one personality measurement by applying at least one model to the set of generated diagnostic features;

matching, at the platform server, the personality profile associated with the first user with at least one recommendation item; and transmitting, from the platform server, the recommended item to the first user.

2. The method of claim 1, wherein the recommended item includes at least one of a product, a service or a personality profile associated with a second user.

3. The method of claim 2, wherein matching the personality profile associated with the first user with the at least one recommended item, further comprises:

determining a match between the at least one psychometric measurement in the personality profile associated with the first user and at least one of a characteristic associated with a product, a characteristic associated with a service, and a psychometric scale associated with a second user.

4. The method of claim 1, wherein the personality measurement comprises at least one of a psychometric measurement, a biometric measurement, a behaviometric measurement.

5. The method of claim 1, wherein the personality profile further comprises at least one of decision strategies, social data, demographic data, and transactional data.

6. The method of claim 1, further comprising:
transmitting the generated personality profile to the first user.

7. The method of claim 1, further comprising:
receiving, at a platform server, a request for a strategy to achieve a goal associated with the first user, the goal being associated with at least one of a personal development, a career, a business, and a personal relation.

8. The method of claim 7, wherein the at least one recommendation item transmitted to the first user is the strategy to achieve the goal.

9. The method of claim 7, further comprising:
correlating the personal identity profile for the first user with at least a second user;
generating a recommendation for the first user on at least one communication strategy to at least one goal, the at least one goal being determined from a communication with the at least second user;
generating a recommendation for the at least second user on at least one other communication strategy to achieve at least another goal, the at least another goal being determined from a communication with the at least second user in communication with the first user.

10. The method of claim 1, wherein the personality data comprises collecting at least one of text data, video data and audio data.

11. The method of claim 10, wherein the text data includes at least one of a chat message, an e-mail message, a text message, a post in a social network and a speech transcript, obtained from a speech-to-text application from one of the plurality of source devices associated with the first user.

12. The method of claim 10, wherein the personality data further includes at least one of a photo, video and audio data obtained from at least one of a user profile in a social network, a screenshot, a smartphone camera, a drawing, a surveillance camera, and a web camera.

13. The method of claim 10, wherein extracting the invariants from each of the observable behavior manifestations in the set of observable behavior manifestation includes at least one of referencing a sentiment dictionary and counting a number of words in text data with positive sentiment.

14. The method of claim 10, further comprises determining a mood of the first user based on the number of words in the text data with positive sentiment.

15. The method of claim 1, further comprises determining psychometrics of the first user based on at least one of grammar patterns, syntactic patterns and speech patterns extracted from the personality data.

16. The method of claim 1, further comprises determining psychometrics of the first user based on patterns of multimodal communication, the patterns of multimodal communications including prosodic patterns, mimics and gestures extracted from the personality data.

17. The method of claims 1, further comprises determining at least one correlation between the personality scale of the personality profile and at least one of an anthropological feature, a characteristic of appearance, a cinematic, a mimic, a facial expression, a micromovement of muscles on a face, a context of the personal data, a linguistic characteristic, a prosodia, a social characteristic, and a demographic characteristic.

18. The method of claim 1, wherein at least one application stored on a computing device associated with the first user changes based on the recommendation item.

19. The method of claim 1, wherein machine learning model further comprises collecting social data; and training the machine learning model based on the collected social data.

20. The method of claim 1, wherein the machine learning model further comprises correlating the personality profile obtained from one source with a second personality profile obtained from other sources.

21. A system for providing recommendations based digital behavior of the first user corresponding to the use of each of a plurality of source devices by a first user, the system comprising:

one or more processors; and
a non-transitory computer readable medium storing a plurality of instructions, which when executed, cause the one or more processors to:
receive, at a platform server from each of the plurality of source devices, personality data of the first user, the received personality data representing digital behavior of the first user including at least one of text data, video data, image data, and audio data generated by the use of each of the source devices by the first user and including social media data generated by crawling social media content associated with the user, the received personality data being unstructured data;

abstract, at the platform server, the received personality data using a plurality of data abstraction layers, wherein each data abstraction layer processes the received personality data independently of other data abstraction layers, the plurality of data abstraction layers including:

a first abstraction layer, wherein the first abstraction layer transmits the received unstructured personality data through a plurality of data channels simultaneously based on data types associated with the personality data, wherein the plurality of data channels process the received unstructured personality data, the data channels including (i) a text channel that filters and corrects the text data for grammatical errors, (ii) a video channel that removes digital artifacts from the video, (iii) an image channel that removes digital artifacts from the image data, and (iv) an audio channel that enhances the audio data and applies speech recognition to the enhanced audio data; and a second abstraction layer, wherein the second abstraction layer generates, at the computer perception engine associated with the platform server, a set of observable behavior manifestations by parsing the processed personality data from the plurality of data channels using a mathematical model associated with the data channel the received personality data was transmitted through, each of the mathematical models being machine learning models that are trained using the processed personality data; and a third abstraction layer, wherein the third abstraction layer generates, at the computer perception engine, a set of diagnostic features associated with the first user by (1) extracting invariants from each of the observable behavior manifestations in the set of observable behavior manifestation, the extracted invariants being measurable representations of behavioral aspects of the first user represented within the text data, video data, image data, and audio data, and (2) normalizing and converting the extracted invariants into a set of values that include at least one of a representation of a class id, a Boolean value, or a normalized real value from 0 to 1, the set of values being the set of diagnostic features associated with the first user;

transmit, by the computer perception engine, the set of diagnostic features to a personal assessment engine associated with the platform server;

generate, at the personal assessment engine associated with the platform server, a personality profile associated with the first user including at least one personality measurement by applying at least one model to the set of generated diagnostic features;

match, at the platform server, the personality profile associated with the first user with at least one recommendation item; and transmit, from the platform server, the recommended item to the first user.

22. The method of claim 21, further comprising:
receive, at a platform server, a request for a strategy to achieve a goal associated with the first user, the goal being associated with at least one of a personal development, a career, a business, and a personal relation.

23. The method of claim 22, wherein the at least one recommendation item transmitted to the first user is the strategy to achieve the goal.

24. The method of claim 22, further comprising:
correlate the personal identity profile for the first user with at least a second user;
generate a recommendation for the first user on at least one communication strategy to at least one goal, the at least one goal being determined from a communication with the at least second user;
generate a recommendation for the at least second user on at least one other communication strategy to achieve at least another goal, the at least another goal being determined from a communication with the at least second user in communication with the first user.

25. The method of claim 21, wherein the recommended item includes at least one of a product, a service or a personality profile associated with a second user.

* * * * *